A. P. LINN.
BEARING SLEEVE PULLER.
APPLICATION FILED MAR. 2, 1920.

1,408,614.

Patented Mar. 7, 1922.

Inventor.
Arthur P. Linn
By
Attorney.

UNITED STATES PATENT OFFICE.

ARTHUR P. LINN, OF LOS ANGELES, CALIFORNIA.

BEARING-SLEEVE PULLER.

1,408,614.    Specification of Letters Patent.    Patented Mar. 7, 1922.

Application filed March 2, 1920. Serial No. 365,042.

*To all whom it may concern:*

Be it known that I, ARTHUR P. LINN, a citizen of the United States, residing in the city of Los Angeles, county of Los Angeles, and State of California, have invented certain new and useful Improvements in Bearing-Sleeve Pullers, of which the following is a specification.

My invention relates to bearing sleeve pullers, and more particularly to a simple device by means of which the bearing sleeves can be quickly and easily removed from a bearing.

In order to explain my invention, I have illustrated one practical embodiment thereof in the accompanying sheet of drawings, in which,—

Figure 1 is a plan view thereof, with bearing sleeve thereon;

Figure 3:
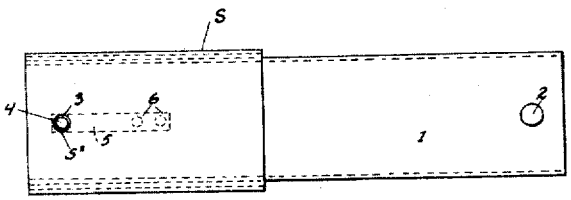
Figure 3 is an end view thereof, partly in section on line 3—3.
Figure 2:
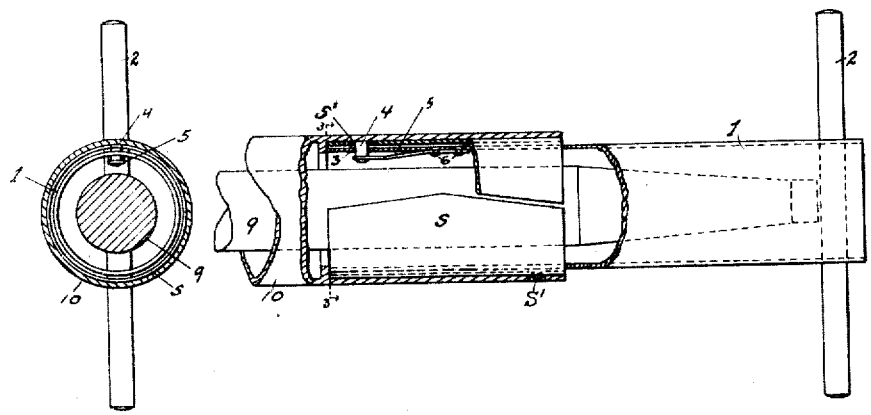
Figure 2 is a side elevation, partly in section.

Referring now more in detail to the drawings, my invention as here embodied for illustrative purposes, comprises a tubular member, 1, provided with a handle, 2, at one end, and at its other end, provided with a hole, 3, through its side. Mounted in this hole is a stud, 4, secured to the end of a spring member, 5, attached at its other end to the inside of the tubular member 1, as at 6.

A bearing sleeve, S, is shown on the end of the tubular member 1, as it would be positioned during the removal operation. These bearing sleeves are provided with holes, as $S^2$, positioned to admit grease to their bearings. Said sleeve is also provided with a holding knob, as S', adapted to seat in a corresponding depression in the bearing in a well known manner. Any attempt to pull the sleeve straight out by applying pull at the hole in the sleeve, tends to cause the knob S' to seat more firmly in said depression and makes it difficult without considerable power to remove the sleeve. By providing an instrument by means of which said sleeve can be turned, the knob is easily turned out of the depression and then it can be easily pulled from the bearing. The stud 4, on the spring 5, is of such size relative to the hole 3, in the tubular member, that the strain on the stud comes against the wall of the tubular member and not on the spring 5. The position of the hole 3, and of the stud 4, corresponds with the position of the hole $S^2$ in the sleeve, that is, it is positioned the same distance from the end of the member 1, that the hole in the sleeve is from the end of the sleeve. The tubular member 1 is, therefore, inserted until it bears against the stop or inside of the bearing and then turned and as soon as said stud comes into register with the hole $S^2$ in the sleeve, it automatically moves out into said hole, as indicated in Fig. 1. It will be understood, of course, that the stud must be pressed inwardly as the tubular member is inserted. This is easily done by hand. The tubular member 1 can also be inserted over the shaft or axle 9 which will enter the tubular member as the tubular member enters the bearing sleeve, as will be readily understood.

Thus I have provided a very simple, cheap and practical device for quickly and easily removing bearing sleeves from their bearings. It is quickly inserted and so made that the pulling stud registers circumferentially with the hole in the sleeve, and it is only necessary to turn the tool after it is fully inserted and the stud automatically springs out into said hole. The sleeve is given a turn and is then easily pulled from its bearing. I do not limit my invention to the details here shown except as I may be limited by the hereto appended claims, for I am aware that many changes can be made without departing from the spirit of my invention.

I claim:

1. A bearing sleeve puller comprising a member adapted to be inserted into said sleeve and having a spring pressed stud projecting therefrom and adapted to be pressed back into said member when it is inserted into said sleeve, said stud being adapted to be automatically moved outwardly through a corresponding opening in said sleeve when in register therewith, and a handle on said member for turning and pulling it with the sleeve from the bearing.

2. A bearing sleeve puller comprising a member adapted to be inserted into said bearing sleeve, said sleeve having a hole therein, said member having a stud inserted through its side a distance from its end corresponding to the distance of the hole in the sleeve from its end, a spring in said member normally pressing said stud outwardly whereby it is moved into the hole in said sleeve when moved to register therewith, and means on said member for turning it and pulling it, substantially as described.

3. A sleeve bearing puller comprising a tubular member adapted to be inserted into a bearing sleeve having a hole through its side, said member having a hole through its side positioned from its end to correspond with the position of the hole in said bearing sleeve, for the purpose indicated, a spring pressed stud in said hole in said tubular member and adapted to enter the hole in said sleeve when moved into register therewith, and a hand grip on said tubular member for turning and pulling the same, substantially as described.

Signed at Los Angeles, California, this 21st day of February, 1920.

ARTHUR P. LINN.

In presence of—
D. O. FAWCETT,
W. R. LITZENBERG.